United States Patent
Huang et al.

(10) Patent No.: US 8,672,085 B2
(45) Date of Patent: Mar. 18, 2014

(54) VARIABLE RATIO TRANSMISSION MECHANISM

(75) Inventors: Chien-Tai Huang, Changhua County (TW); Yan-Sin Liao, Changhua County (TW); Tsung-Hsien Hu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 0 days.

(21) Appl. No.: 13/336,566

(22) Filed: Dec. 23, 2011

(65) Prior Publication Data

US 2013/0161115 A1 Jun. 27, 2013

(51) Int. Cl.
*B62D 5/00* (2006.01)
*B62D 5/04* (2006.01)

(52) U.S. Cl.
USPC ............................ 180/443; 180/421; 180/444

(58) Field of Classification Search
USPC ......... 180/402, 417, 421, 422, 428, 443, 444, 180/446
See application file for complete search history.

(56) References Cited

U.S. PATENT DOCUMENTS

| 7,278,512 B2 * | 10/2007 | Kodama et al. | 180/421 |
| 2008/0023258 A1 * | 1/2008 | Inoue | 180/444 |

* cited by examiner

*Primary Examiner* — Kevin Hurley
*Assistant Examiner* — Marc A Scharich
(74) *Attorney, Agent, or Firm* — Banner & Witcoff, Ltd.

(57) ABSTRACT

A variable ratio transmission mechanism is used in an automobile. The automobile includes first and second steering shafts extending along a first direction. The variable ratio transmission mechanism includes a securing unit connected to the first steering shaft, a connecting unit connected to the second steering shaft, a motor connected to the securing unit and including a revolving shaft that extends rotatably along a second direction different from the first direction, and a transmitting unit including a worm gear that is provided on the connecting unit and a worm that is provided on the revolving shaft and that engages and is angularly-slidable relative to the worm gear.

6 Claims, 3 Drawing Sheets

VARIABLE RATIO TRANSMISSION MECHANISM

BACKGROUND OF THE INVENTION

1. Field of the Invention

The invention relates to a transmission mechanism, more particularly to a variable ratio transmission mechanism for an automobile steering system.

2. Description of the Related Art

A conventional variable ratio transmission mechanism, as disclosed in U.S. Pat. No. 7,278,512, is used in an automobile steering system. The automobile steering system includes a first steering shaft coupled to a steering wheel, and a second steering shaft coaxial to the first steering shaft and coupled to a pinion shaft that is connected to a wheel unit of the automobile. The conventional variable ratio transmission mechanism includes a first unit coupled to the first steering shaft, and a second unit that is driven by the first unit and that is coupled to the second steering shaft. The first unit includes a first housing connected co-rotatably to the first steering shaft, a rotor disposed in the first housing and coaxial to the first steering shaft, and a lock mechanism for locking the rotor. The second unit includes a connector connected to the rotor, and a second housing coupled to the connector and the second steering shaft.

When the lock mechanism is operated to lock the rotor from rotating relative to the first housing, the first steering shaft is rotatable with the first housing, the rotor, the connector, the second housing and the second steering shaft, so that the second steering shaft rotates in the same rotational velocity of the first steering shaft.

When the lock mechanism is operated to unlock the rotor from the first housing, the second steering shaft would be driven rotatably by the rotor and has a rotational velocity different from that of the first steering shaft. Consequently, under the same rotational velocity of the steering wheel, the rotational velocity of the second steering shaft can be adjusted to be suitable for high-speed or low-speed motion of the automobile, thereby ensuring safety of the steering action of the automobile.

However, since the rotor does not have a self-locking function, the lock mechanism is required to control the second steering shaft to rotate synchronously or non-synchronously relative to the first steering shaft, thereby resulting in a relatively complex structure and a relatively high manufacturing cost.

SUMMARY OF THE INVENTION

Therefore, the object of the present invention is to provide a variable ratio transmission mechanism with a function of self-locking and with a relatively simple structure.

Accordingly, a variable ratio transmission mechanism is adapted for use in an automobile steering system. The automobile steering system includes coaxially-disposed first and second steering shafts that extend along a first direction. The variable ratio transmission mechanism comprises a securing unit adapted to be connected co-rotatably to the first steering shaft about a first axis that extends in the first direction, a connecting unit adapted to be connected co-rotatably to the second steering shaft about the first axis, a motor, and a transmitting unit. The motor includes a main body connected to one of the securing unit and the connecting unit and co-rotatable with the one of the securing unit and the connecting unit about the first axis and a revolving shaft extending along a second axis that extends in a second direction different from the first direction and revolvable relative to the main body. The transmitting unit includes a first transmitting component that is provided on the other one of the securing unit and the connecting unit, and a second transmitting component that is provided on the revolving shaft of the motor and that engages and is angularly-slidable relative to the first transmitting component.

When the first steering shaft rotates about the first axis for a selected rotational angle without the revolving movement of the revolving shaft, the first and second transmitting components are angularly positioned relative to each other, and the second steering shaft is rotated about the first axis for the selected rotational angle.

When the first steering shaft rotates about the first axis for a selected rotational angle with the revolving movement of the revolving shaft about the second axis, the second steering shaft is rotated about the first axis for a different rotational angle.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
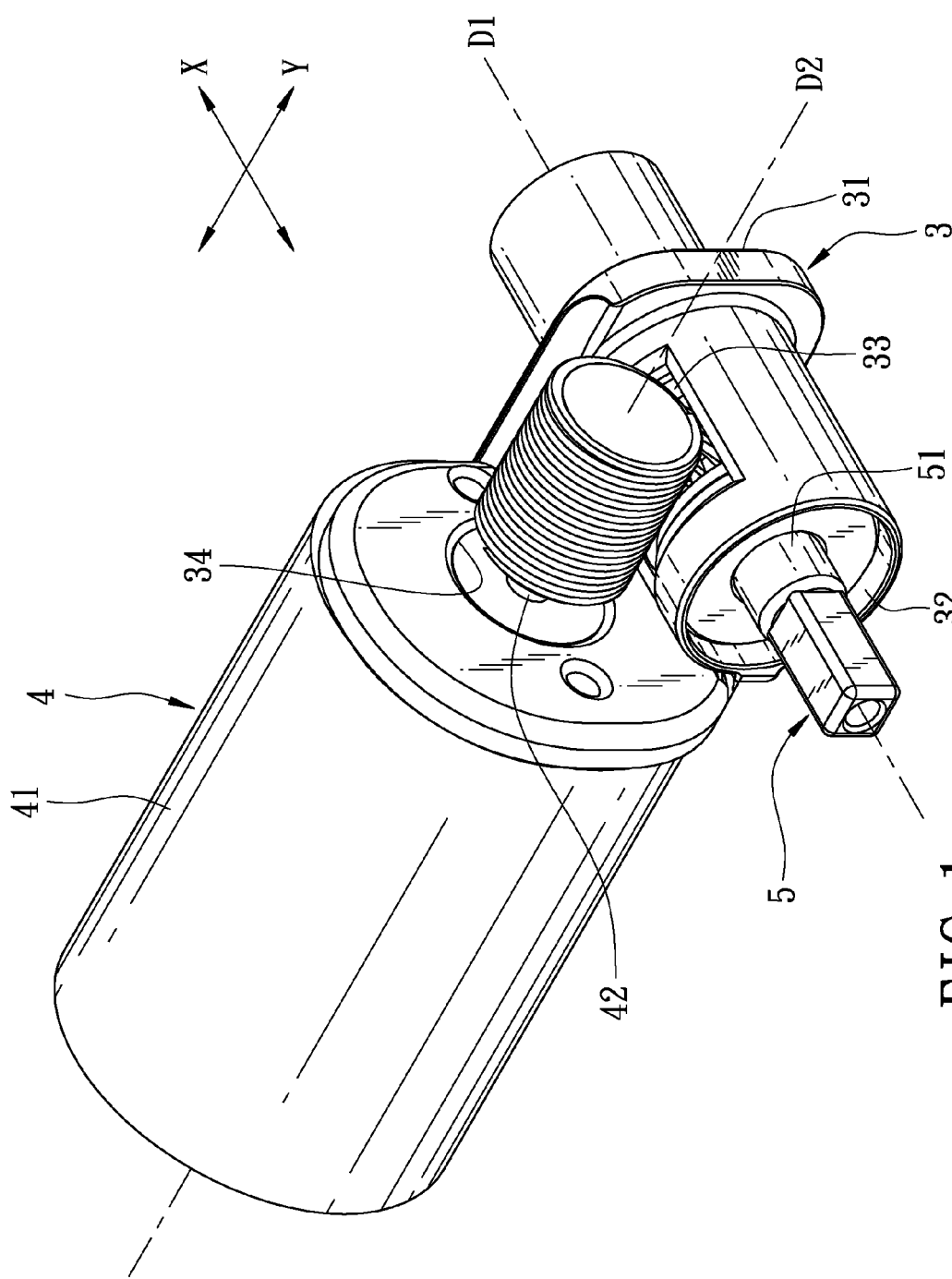
FIG. 1 is a perspective view of a preferred embodiment of a variable ratio transmission mechanism according to the invention.
Figure 2:
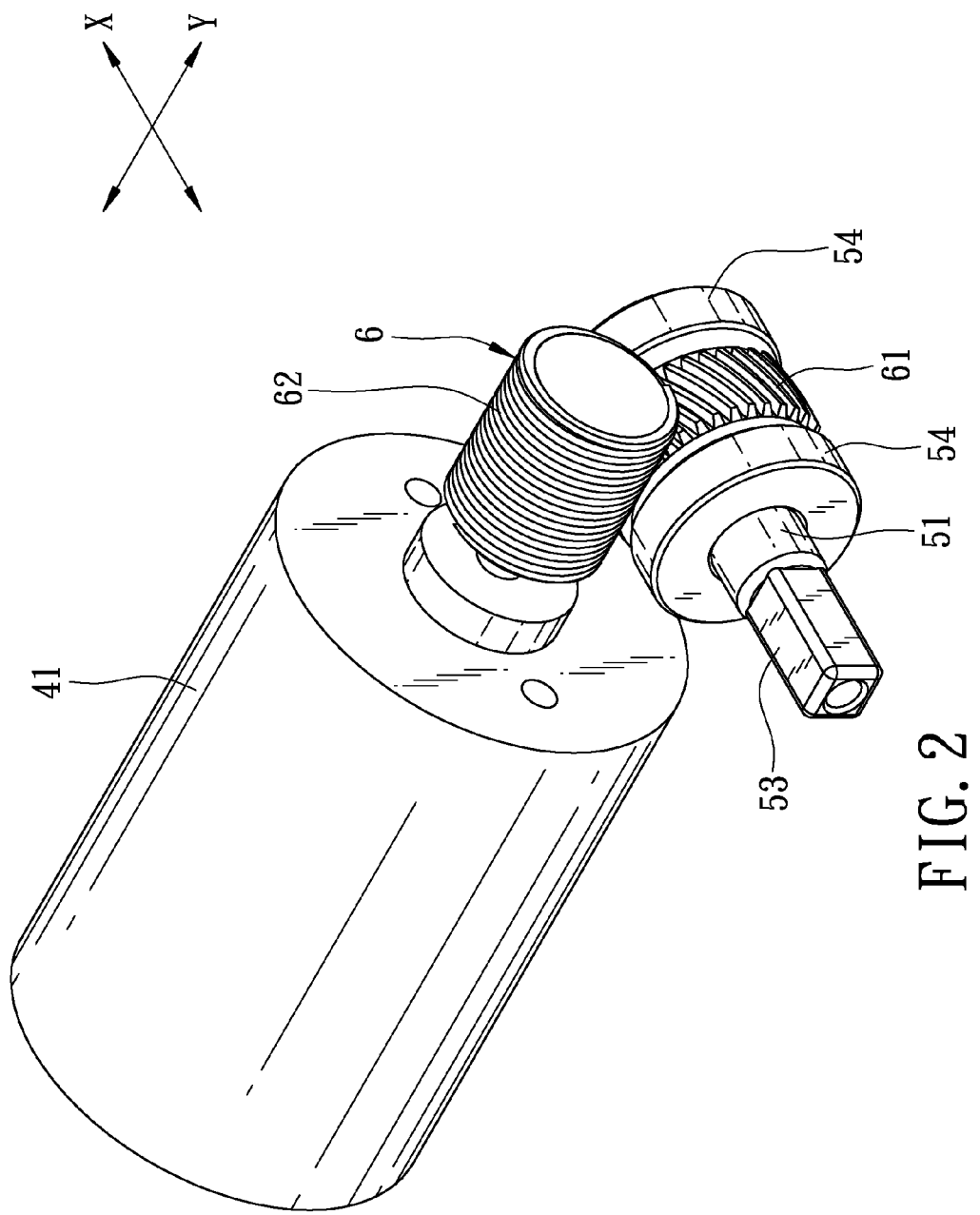
FIG. 2 is a fragmentary perspective view of the preferred embodiment.
Figure 3:
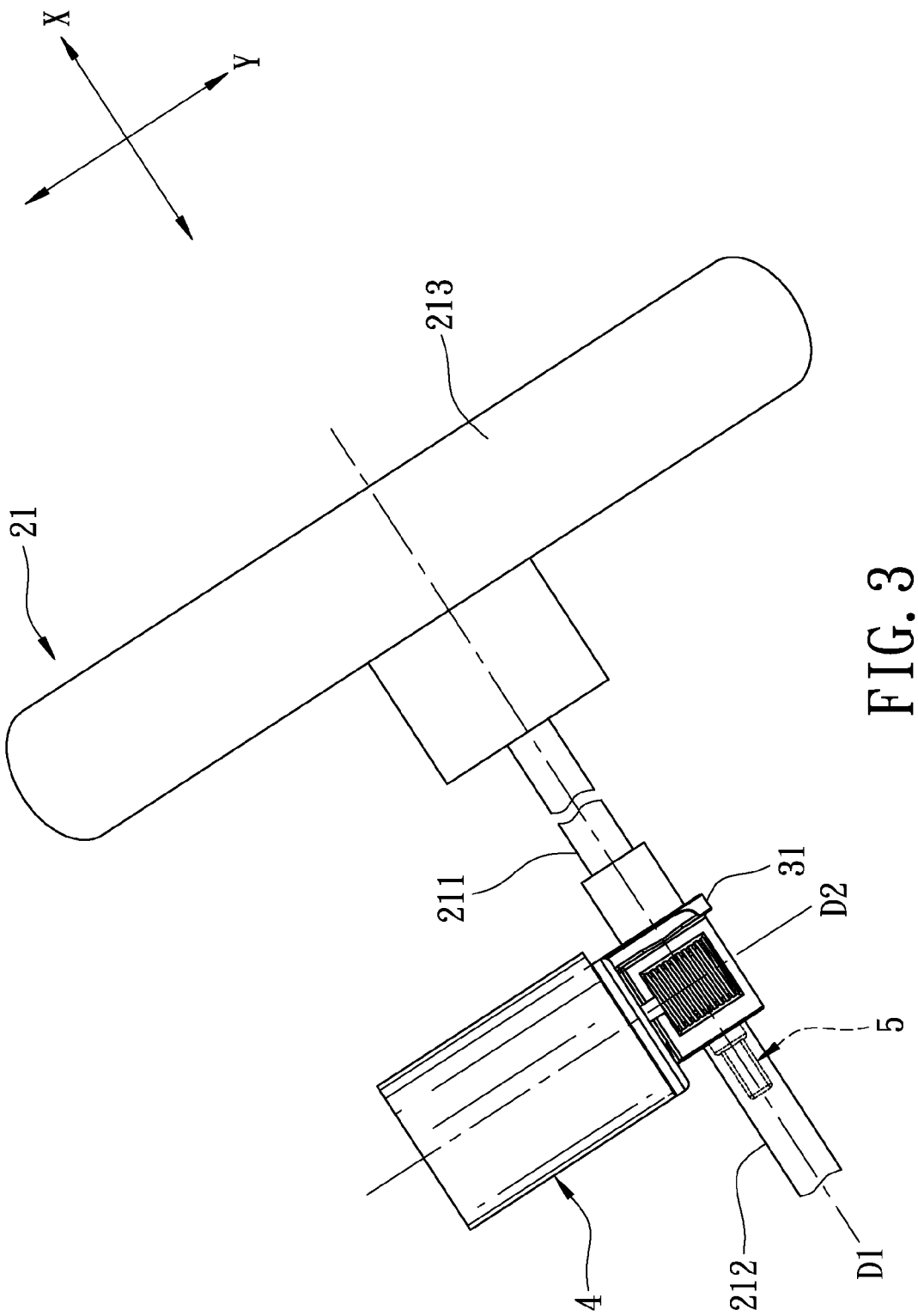
FIG. 3 is a fragmentary schematic view illustrating the preferred embodiment connected to a steering wheel of an automobile.

As shown in FIGS. 1, 2 and 3, the preferred embodiment of a variable ratio transmission mechanism of this invention is adapted for use in a steering system 21 of an automobile (not shown). The automobile steering system 21 includes coaxially-disposed first steering shaft 211 and second steering shaft 212 that extend along a first direction (X), and a steering wheel 213 coupled to the first steering shaft 211. The variable ratio transmission mechanism comprises a securing unit 3 adapted to be connected co-rotatably to the first steering shaft 211 about a first axis (D1) that extends in the first direction (X), a connecting unit 5 adapted to be connected co-rotatably to the second steering shaft 212 about the first axis (D1), a motor 4, and a transmitting unit 6.

In this embodiment, the motor 4 includes a main body 41 connected to the securing unit 3 and is co-rotatable with the securing unit 3 about the first axis (D1) and a revolving shaft 42 that extends along a second axis (D2) extending in a second direction (Y) perpendicular to the first direction (X) and that is revolvable relative to the main body 41 about the second axis (D2). The transmitting unit 6 includes a first transmitting component 61 that is configured as a worm gear and that is provided on the connecting unit 5, and a second transmitting component 62 that is configured as a worm, that is provided on the revolving shaft 42 of the motor 4, and that engages and is angularly-slidable relative to the first transmitting component 61.

The securing unit 3 includes a hollow securing member 31 that has an end adapted to be connected co-rotatably to the first steering shaft 211, and an opposite end along the first axis (D1) formed with a connecting hole 32 that receives rotatably the first transmitting component 61 of the transmitting unit 6. The securing member 31 further has an opening 33 that corresponds in position to the first transmitting component 61 so as to permit the engagement between the first transmitting component 61 and the second transmitting component 62. The securing member 31 further has an extension segment formed with a through hole 34. The main body 41 of the motor 4 is connected to the extension segment of the securing member 31 at one side opposite to the connecting unit 5 along the second axis (D2), and the revolving shaft 42 extends from the main body 41 through the extension segment via the through hole 34 toward the first transmitting component 61 (i.e., the extension segment is disposed between the main body 41 and the second transmitting component 62).

The connecting unit 5 includes a rotating shaft 51 that extends into the securing member 31 through the connecting hole 32 and that is rotatable about the first axis (D1); and the first transmitting component 61 is sleeved on the rotating shaft 51 and meshes rotatably with the second transmitting component 62.

The connecting unit 5 further includes a connecting shaft 53 extending from the rotating shaft 51 along the first axis (D1) and adapted to be connected co-rotatably to the second steering shaft 212, and a pair of bearings 54 sleeved on the rotating shaft 51, disposed between the rotating shaft 51 and the securing member 31, and flanking the first transmitting component 61 along the first axis (D1).

When the first steering shaft 211 rotates about the first axis (D1) for a selected rotational angle without the revolving movement of the revolving shaft 42, the first transmitting component 61 and the second transmitting component 62 are angularly positioned relative to each other because of their self-locking characteristic, and the second steering shaft 212 is consequently and synchronously rotated about the first axis (D1) for the selected rotational angle.

When the first steering shaft 211 rotates about the first axis (D1) for a selected rotational angle with the revolving shaft 42 revolving about the second axis (D2), the second steering shaft 212 is rotated about the first axis (D1) for a different rotational angle which is the sum of the selected rotational angle of the first steering shaft 211 and an adjusting rotational angle of the connecting unit 5 driven by the revolving shaft 42 relative to the securing unit 3. Therefore, under the same rotational angle of the steering wheel 213, the rotational angle of the second steering shaft 212 can be adjusted to be suitable for high-speed or low-speed motion of an automobile by controlling the motor 4, thereby ensuring safety of the steering action of an automobile.

To sum up, the preferred embodiment of the variable ratio transmission mechanism of this invention has a self-locking feature and a relatively simple structure by means of the transmitting unit 6 to thereby achieve the object of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A variable ratio transmission mechanism adapted for use in an automobile steering system, the automobile steering system including coaxially-disposed first and second steering shafts that extend along a first direction, said variable ratio transmission mechanism comprising:

a securing unit connected co-rotatably to the first steering shaft about a first axis that extends in the first direction;

a connecting unit connected co-rotatably to the second steering shaft about the first axis;

a motor including a main body that is connected to one of said securing unit and said connecting unit and that is co-rotatable with the one of said securing unit and said connecting unit about the first axis, and a revolving shaft that extends along a second axis extending in a second direction different from the first direction and that is revolvable relative to said main body; and a transmitting unit including a first transmitting component that is provided on the other one of said securing unit and said connecting unit, and a second transmitting component that is provided on said revolving shaft of said motor and that meshes with said first transmitting component;

wherein, when the first steering shaft rotates about the first axis by a selected rotational angle without a revolving movement of said revolving shaft, said first and second transmitting components are angularly positioned relative to each other, and the second steering shaft is rotated about the first axis by the selected rotational angle;

wherein, when the first steering shaft rotates about the first axis by a selected rotational angle with the revolving movement of said revolving shaft about the second axis, the second steering shaft is rotated about the first axis by a different rotational angle;

wherein said main body of said motor is connected co-rotatably to said securing unit, and said first transmitting component is provided on said connecting unit; and wherein said second transmitting component is configured as a worm, said first transmitting component being configured as a worm gear.

2. The variable ratio transmission mechanism as claimed in claim 1, wherein said securing unit includes a securing member that has an end connected co-rotatably to the first steering shaft, and an opposite end formed with a connecting hole, said first transmitting component of said transmitting unit being disposed rotatably in said connecting hole, said securing member further having an opening that corresponds in position to said first transmitting component so as to permit the engagement between said first transmitting component and said second transmitting component.

3. The variable ratio transmission mechanism as claimed in claim 2, wherein:

said connecting unit includes a rotating shaft extending into said securing member through said connecting hole, and rotatable about the first axis; and said first transmitting component is sleeved on said rotating shaft and meshing with said second transmitting component.

4. The variable ratio transmission mechanism as claimed in claim 3, wherein said connecting unit further includes a connecting shaft extending from said rotating shaft along the first axis and connected co-rotatably to the second steering shaft.

5. The variable ratio transmission mechanism as claimed in claim 3, wherein said connecting unit further includes a pair of bearings sleeved on said rotating shaft, disposed between said rotating shaft and said securing member, and flanking said first transmitting component along the first axis.

6. The variable ratio transmission mechanism as claimed in claim 1, wherein the first direction is perpendicular to the second direction.

* * * * *